United States Patent
Gwilliam

[11] 3,782,554
[45] Jan. 1, 1974

[54] PRESSURES FILTERS AND FILTER ELEMENTS THEREFOR

[75] Inventor: Ralph Derek Gwilliam, St. Austell, England

[73] Assignee: English Clays Lovering Pochin & Company Limited, St. Austell, Cornwell, England

[22] Filed: Sept. 18, 1972

[21] Appl. No.: 289,840

Related U.S. Application Data

[63] Continuation-in-part of Ser. No. 46,342, June 15, 1970, abandoned.

[52] U.S. Cl. ........................ 210/350, 210/489
[51] Int. Cl. ................................ B01d 29/10
[58] Field of Search .............. 210/350, 351, 489, 210/497, 499

[56] References Cited
UNITED STATES PATENTS

| | | | |
|---|---|---|---|
| 3,276,594 | 10/1966 | Gwilliam | 210/350 |
| 2,465,319 | 3/1949 | Whinfield et al. | 161/172 X |
| 3,376,979 | 4/1968 | Bair | 210/499 X |

FOREIGN PATENTS OR APPLICATIONS

| | | | |
|---|---|---|---|
| 907,485 | 10/1962 | Great Britain | 210/351 |
| 1,309,891 | 10/1961 | France | 210/489 |

*Primary Examiner*—Frank A. Spear, Jr.
*Attorney*—Roberts B. Larson et al.

[57] ABSTRACT

A tube pressure filter is provided with a filtering means which comprises (a) filtrate receiving and drainage member including a wire mesh sleeve which is of a size such that it fits closely over an inner tubular body of the tube pressure filter and which in no direction has more than 200 wires to the inch nor a spacing between the wires smaller than about 0.003 inches but which has in at least one direction at least 60 wires to the inch and a spacing between the wires in said one direction not greater than about 0.012 inches, (b) a backing cloth of coarse-textured material and (c) a filter element comprising a seamless filter cloth sleeve which fits closely over the backing cloth and which has a pore size sufficiently small to prevent the passage therethrough of material to be pressure filtered.

9 Claims, 2 Drawing Figures

PRESSURES FILTERS AND FILTER ELEMENTS THEREFOR

This application is a continuation-in-part of my Application Ser. No. 46342 filed 15th June, 1970, now abandoned.

BACKGROUND OF THE INVENTION

This invention relates to tube pressure filters.

It has been known for many years that liquids can be extracted from pulpy materials and from slurries by compressive forces generated by the inflation of an elastically-extensible bladder. More recently, there have been described tube pressure filters which generally comprise two co-axially-disposed and spaced-apart tubular bodies which define between them a chamber of annular cross-section, filtering means supported by one of said tubular bodies, and an impermeable, elastically-extensible wall which divides said chamber into two non-intercommunicating compartments of annular cross-section, one of which is formed between one side of the elastically-extensible wall and one of the tubular bodies and the other of which is formed between the other side of the elastically-extensible wall and the other tubular body. In the operation of such a tube pressure filter the material to be pressure filtered is introduced into one of said compartments, usually the inner compartment, and a hydraulic pressure medium is introduced into the other compartment so as to distend the elastically-extensible wall and thus compress the material in said one compartment and form a cake of the solid material on the filtering means which is supported by the tubular body which defines, in part, said one compartment, the liquid being expressed through the filtering means and passing out of the tube pressure filter, for example through apertures formed in the tubular body which supports the filtering means. Examples of tube pressure filters of this type and of their use for reducing the liquid content of various wet materials are described in British Pat. Spec. No. 907,485 and in Belgian Pat. Spec. No. 717,264. The tube pressure filters described in Belgian Pat. Spec. No. 717,264 can be employed, inter alia, to reduce the liquid content of a wide range of wet, particulate solid materials, including wet, very fine particulate solid materials which comprise 20 percent or more by weight of particles smaller than 20 microns which materials cannot readily be dewatered using conventional plate filter presses as they tend to form compressible filter cakes of low permeability so that the application thereto of high pressures, i.e., about 500 psig or greater, is required to produce a filter cake of low moisture content, i.e., less than about 25 percent by weight of moisture; examples of such wet, very fin particulate solid materials are aqueous slurries of mineral pigments, e.g. clays and chalks. On the other hand, the tube pressure filters described in British Pat. Spec. No. 907,485 are inherently unsuitable for filtering wet, very fine particulate solid materials, such as clays and chalks, and are primarily designed for the filtration of slurries of relatively coarse materials, such as coal fines. For this latter purpose, it is sufficient to employ filtering means which comprise, for example, a perforated plate having a filter gauze fitted thereon. Such a filtering means may be suitable for the filtration of relatively coarse materials, such as coal fines, but it is not possible to use the same type of filtering means to filter wet, very fine particulate solids such as clay slurries. Therefore, the filtering means used in the tube pressure filters described in Belgian Pat. Spec. No. 717,264 preferably comprises a filter cloth which is supported on a wire mesh screen which is arranged around the inner tubular body of the tube pressure filter and which assists drainage of the filtrate. It is found, however, that difficulties may still be encountered in the operation of tube pressure filters when treating wet, very fine particulate solids, such as clay slurries. Thus, one method of discharging a filter cake consisting essentially of a very fine particulate solid involves passing a blast of gas, usually air, through the filter cloth in a direction which is the reverse of the direction of flow of filtrate, and the filtering means must therefore be able to withstand the repeated application of hydraulic pressures in excess of, say, 500 psig, followed by the application of blasts of compressed air to the side of the filter element which is opposite to that on which the hydraulic pressure is applied, to discharge the filter cake. There is also a problem in fitting the filter cloth over the wire mesh screen arranged around the inner tubular body. For example, if the filter cloth is constructed in the form of a sleeve and if the diameter of the sleeve is too close to that of the outer diameter of the wire mesh screen over which it is to be fitted, it is impossible to pull the filter cloth sleeve over the inner tubular body and, if the filter cloth sleeve fits too loosely over the wire mesh screen, wrinkles are left in the filter cloth sleeve and these are another potential source of weakness.

It is an object of the present invention to provide a tube pressure filter including filtering means which overcomes the above disadvantages.

SUMMARY OF THE INVENTION

According to the present invention there is provided, in a tube pressure filter comprising inner and outer tubular bodies arranged substantially coaxially one within the other and spaced apart so as to define between them a chamber of annular cross-section, filtering means supported by the inner of said tubular bodies, and an impermeable, elastically-extensible wall which divides said chamber into two non-intercommunicating compartments of annular cross-section, one of said compartments being defined generally by the inner of said two tubular bodies and by the impermeable, elastically-extensible wall and the other of said compartments being defined generally by the outer of said two tubular bodies and by the impermeable, elastically-extensible wall, the improvement which comprises forming the filtering means as an assembly comprising a. a filtrate receiving and drainage means including a wire mesh sleeve which is of a size such that it fits closely over the inner of said two tubular bodies and which in no direction has more than 200 wires to the inch nor a spacing between the wires smaller than about 0.003 inches but which has in at least one direction at least 60 wires to the inch and a spacing between the wires in said one direction not greater than about 0.012 inches, whereby drainage of filtrate along the wall of the inner tubular body is facilitated, b. a backing cloth of coarse-textured material on said filtrate receiving and drainage means and c. a filter element comprising a seamless filter cloth sleeve which fits closely over the backing cloth and which has a pore size sufficiently small to prevent the passage therethrough of the solids in a material to be pressure filtered.

DESCRIPTION OF THE PREFERRED EMBODIMENTS

Figure 1:
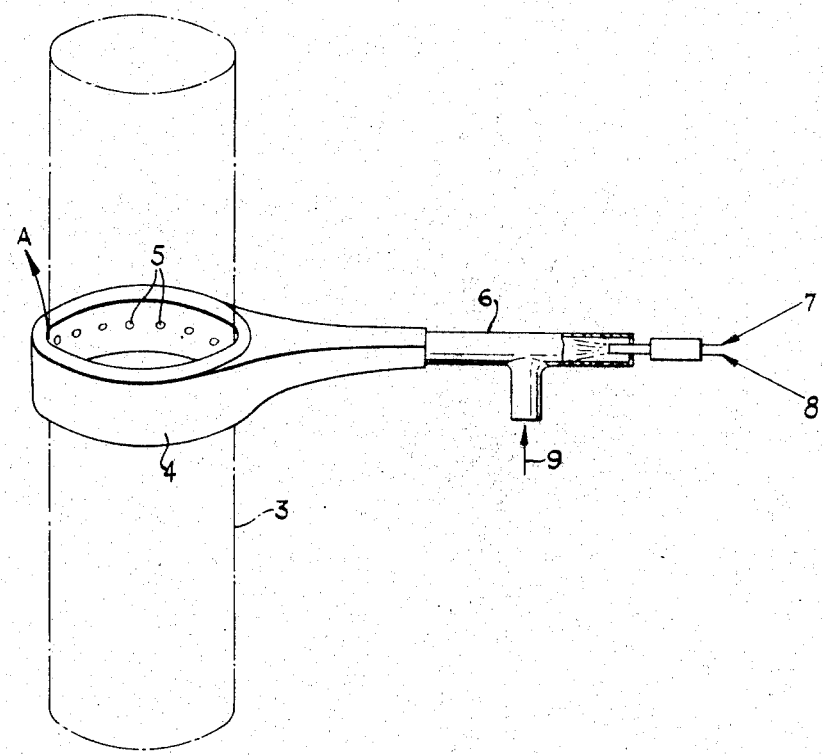

It has been found that the wire mesh sleeve must have not more than 200 wires, and preferably not more than 120 wires, to the inch in any one direction and at least 60 wires to the inch in at least one direction since, if there are not at least 60 wires to the inch in at least one direction, the backing cloth immediately adjacent to the wire mesh sleeve is forced, during use of the pressure filter, into the apertures of the mesh under the action of the hydraulic pressure on the filtering surface, thus preventing the passage of filtrate through the wire mesh sleeve, and, if there are more than 200 wires to the inch in any one direction, the wires required to produce the mesh are very fine and the thickness of the wire mesh is not sufficient to provide adequate drainage of filtrate between the filter element and the outer wall of the inner tubular body. The wire mesh sleeve should be made as a close fit with the inner tubular body and its surface should be treated to remove burrs and irregularities. The presence of the wire mesh sleeve greatly improves the drainage of filtrate away from the filter cloth and reduces the number of holes which would otherwise have to be provided through the wall of the inner tubular body of the pressure filter.

The thickness of the wires used to prepare the wire mesh sleeve will depend on the number of wires per unit length in the mesh and generally will lie within the ranges specified in the following Table.

TABLE

| wires/inch | wire thickness (in.) | wire spacings (in.) |
|---|---|---|
| 200 | 0.0018 to 0.0024 | 0.0032 to 0.0026 |
| 170 | 0.0021 to 0.0029 | 0.0038 to 0.0030 |
| 120 | 0.0031 to 0.0041 | 0.0051 to 0.0042 |
| 100 | 0.0038 to 0.0049 | 0.0062 to 0.0051 |
| 60 | 0.0059 to 0.0087 | 0.0108 to 0.0080 |

Over the wire mesh sleeve there is disposed a backing cloth in the form of a sleeve of coarse-textured material which preferably has a thickness not greater than 2 mm. The coarse-textured backing cloth is advantageously prepared in a manner such that when the backing cloth is subjected to tension in a given direction the backing cloth elongates in that direction and contracts in the direction normal to the line of action of the tension. Such a backing cloth is initially a loose fit over the wire mesh sleeve, but expands in a direction parallel to its longitudinal axis and contracts around its circumference as it is pulled over the wire mesh sleeve, thus fitting the wire mesh sleeve closely. A sleeve of the coarse-textured backing cloth manufactured in the manner described above has the additional advantage that, when hydraulic pressure is applied to the outer surface of the filter element, the pores of the coarse textured backing cloth close thus making it more difficult for solid particles to pass through the filter element, but, on the other hand, when compressed air is blown through the cloth from inside the inner tubular body the pores open to facilitate release of the filter cake. The coarse-textured backing cloth can be formed from natural materials or from man-made polymeric materials. Preferably, the coarse-textured backing cloth is formed from a thermoplastic synthetic polymer, e.g., poly(ethylene terephthalate), a polyamide, e.g., nylon, or poly(vinylidene chloride), in the form of short-staple fibres. A satisfactory backing cloth can be prepared, for example, from short-staple fibres of a synthetic polymer which are laid at random to form a mat, the mat heated to bond the fibres together and then passed through a needle mill, which comprises a very large number of reciprocating barbed needles, to give the mat the properties of a felt. The coarse-textured backing cloth can also be manufactured from natural materials, e.g., heavy weight cotton cloths and felted wollen cloth, in which case the cloth is preferably woven or knitted, and felted by natural means, e.g., washing. A particularly useful form of backing cloth is obtained by laying short-staple fibres of a thermoplastic synthetic polymer upon a grid of continuous filament fibres; the grid may be a woven mesh or may be formed by laying the filling yarns across the warp yarns and bonding them in place to form what is known as a cross-laid scrim. Preferably, the grid is composed of form about 4 to about 10 continuous filament yarns per inch in each direction.

Inter alia the backing cloth helps to increase the life of the filter element since, if a hole appears in the filter cloth sleeve, it is desirable to have a second cloth underneath to help to seal the hole and, in the absence of a backing cloth, any hole would rapidly be made worse by abrasion on the wires of the wire mesh screen.

It is found that if the filter cloth sleeve is prepared from conventional materials and sewn to form a sleeve, the seam may form a point of potential failure. The sleeve of filter cloth is therefore made seamless. The sleeve of filter cloth can be formed from a man-made or natural polymeric material. The man-made polymeric materials are preferably thermoplastic woven materials which have been heat set, e.g., by hot calendering, in order to give a pore size sufficiently small to prevent the finely divided solid matter from passing therethrough. Examples of suitable man-made thermoplastic polymeric materials are poly(ethylene terephthalate), polypropylene and polyamides, e.g., nylons. Examples of suitable natural polymeric materials are cotton and felted wool and these are preferably subjected to gentle singeing to remove projecting fibres and thus improve the release properties of the filter cloth. The choice of material from which the filter cloth is prepared depends to some extent on the nature of the material to be treated by the tube pressure filter; for example, nylons have little resistance to acids and poly(ethylene terephthalate) has little resistance to alkali. The filter cloth is advantageously woven from a continuous filament yarn in order to give the filter cloth good release properties. Initially the filter cloth sleeve is a loose fit over the coarse-textured backing cloth, so that it can be pulled over the wire mesh sleeve or backing cloth. Thereafter it is secured firmly in place by shrinking the material of the filter cloth. In the case of a man-made thermoplastic polymeric material the shrinking can generally be effected by blowing hot air at a temperature in the range of from 150° to 190° C. on to the surface of the filter cloth sleeve from a ring of air jets travelling along the length of the inner tubular body. For example, a ring of air jets can be passed forwards and backwards along the tubular body at a speed in the range from 70 to 150 mm/sec. until a sufficient degree of shrinkage has been obtained, but, under normal conditions, if the initial circumference of the filter cloth sleeve is not more than 1 inch greater than the circumference of the backing cloth on the inner tubular body, one traverse of the ring of jets is sufficient.

An apparatus suitable for shrinking the filter cloth is shown in FIG. 1 of the accompanying drawings. The apparatus comprises an annular duct 4 having a number of holes 5. The annular duct 4 is supplied with hot air by a combustion chamber 6 to which oxygen is fed through a conduit 7 and propane gas through a conduit 8. The propane is burnt in the oxygen to give a flame and additional air is supplied through a duct 9. In use, the filter cloth sleeve 3 is draped over the central portion of the inner tubular body (not shown) of a tube pressure filter, and the annular duct 4 is then arranged to encircle the central portion of the inner tubular body. Hot air is produced in the combustion chamber 6 and the annular duct 4 is passed to and fro along the length of the tubular body. Hot air escapes in a direction substantially parallel to the longitudinal axis of the inner tubular body as is indicated by the arrow A, thereby causing the filter cloth sleeve to shrink. Alternatively, shrinking of the filter cloth sleeve can be effected by connecting the annular duct 4 to a boiler, or other source of saturated steam, and blowing saturated steam at a temperature in the range from 110° to 150°C. on to the surface of the filter cloth sleeve.

Figure 2:
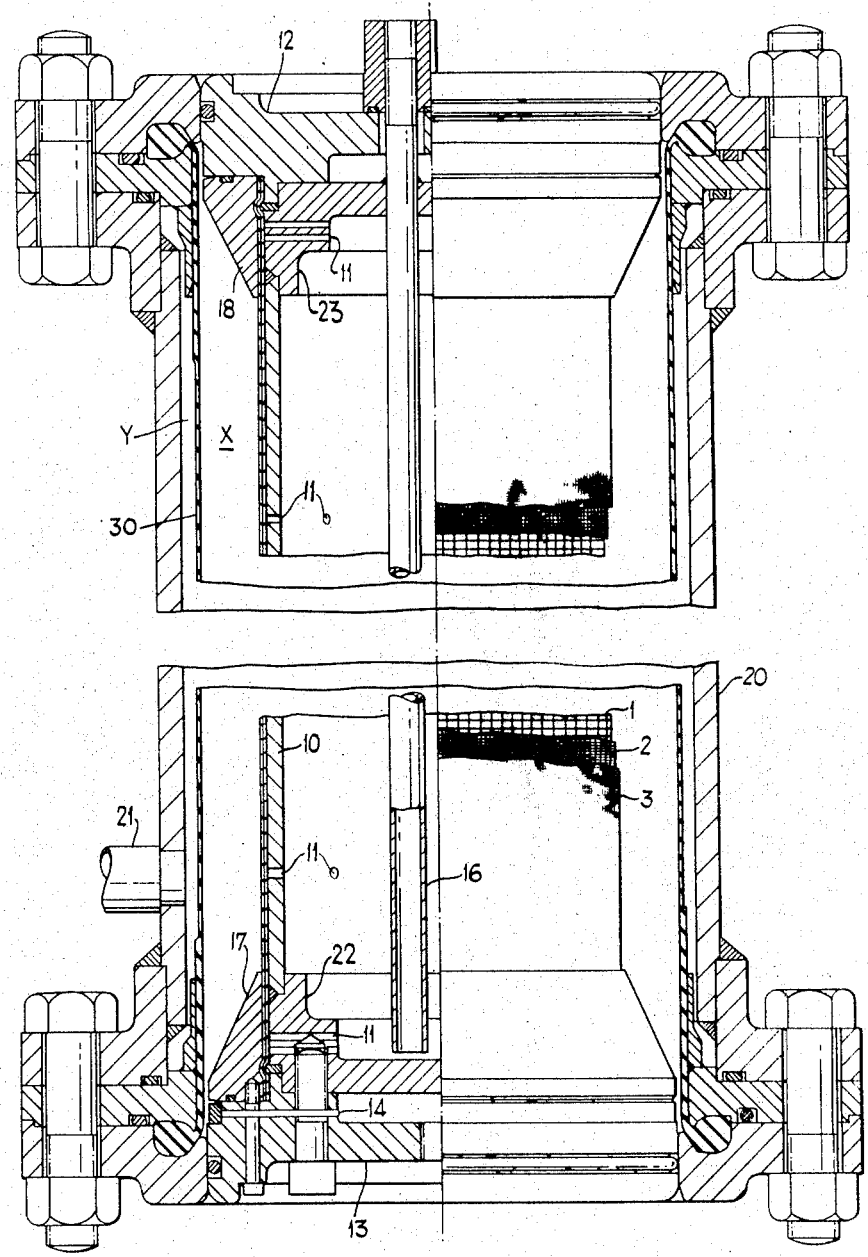

The invention is further illustrated by the following Example in which reference is made to FIG. 2 of the accompanying drawings.

EXAMPLE

In FIG. 2 of the accompanying drawing, there is shown a tube pressure filter essentially comprising a. an inner tubular body which includes a central portion 10, fairings 17 and 18, inner end-caps 22 and 23 and outer end-caps 12 and 13, b. an outer tubular body 20, c. an impermeable elastically-extensible wall 30, and d. a filtering means consisting of a wire mesh sleeve 1, a backing cloth 2, and a filter element consisting of a filter cloth sleeve 3. The filtering means is shown after it has been fitted over the central portion 10 and inner end-caps 22 and 23 of the inner tubular body of the tube pressure filter and the tube pressure filter has been assembled ready for use.

The filtering means consists of a wire mesh sleeve 1 which was manufactured from Fourdrinier paper machine wire having a thickness of 0.0040 inches. The wire was woven in a Hollander weave so that, when formed into a sleeve, there were 10 wires per inch in the longitudinal direction and 100 wires per inch in the circumferential direction. The wire mesh was cut to a size which, when formed into a sleeve, would just slide on to the external wall of the central portion 10 of the inner tubular body of a tubular pressure filter (which is of the type described in Belgian Pat. Spec. No. 717,624). The sides of the wire mesh were joined to form a cylindrical sleeve by soldering, and the joint then ground smooth. The wire mesh sleeve was then slipped over the central portion 10 and inner end-caps 22 and 23 (which had previously been welded to central portion 10) of the inner tubular body, the outer diameter of the central portion 10 being 17.15 cm, i.e., a circumference of 53.9 cm.

A coarse-textured backing cloth 2 of TERYLENE felt, which had been made by forming a mat of randomly laid short-staple fibres and then applying heat to bond the fibres together, was then pulled over the wire mesh sleeve 1 and all wrinkles were smoothed out by hand. The weight of the felt was 406 gm per sq. metre and the thickness 1.02 mm.

Finally, a TERYLENE filter cloth sleeve 3 having a weight of 348 gm. per sq. metre, which had been woven as a seamless tube of circumference 55.8 cm from three strands of 125 denier continuous monofilament yarn, was draped around the TERYLENE backing cloth 2 and one end was secured temporarily in its desired position on the central portion 10 of the inner tubular body by means of a JUBILEE clip. The other end of the TERYLENE filter cloth sleeve 3, which prior to shrinkage overhung the end of the central portion 10 of the inner tubular body, was gripped by hand and twisted to increase the friction between the filter cloth sleeve 3 and the backing cloth 2. As described hereinabove with reference to FIG. 1 of the accompanying drawings, an annular duct providing a ring of gas jets was arranged to blow hot air at a temperature at 170°C. on to the surface of the filter cloth sleeve and was caused to traverse once the length of the central portion 10 of the inner tubular body at a speed of 120 mm per second, thus shrinking the filter cloth sleeve. During the shrinking process the free end of the filter cloth sleeve 3 was allowed to pass through the hand, although tension was maintained to prevent the formation of wrinkles.

After the filter cloth sleeve 3 had been fitted on the central portion 10 of the inner tubular body, the assembly of the tube pressure filter was completed by fitting fairings 17 an 18, and end-caps 12 and 13 to form the inner tubular body, and then locating the inner tubular body within the outer tubular body 20, the latter having mounted therein the impermeable, elastically-extensible sleeve 30. When the tube pressure filter is assembled there are formed two non-communicating compartments X and Y. In use, a material to be pressure filtered is introduced into compartment X through 36 ducts 14 arranged uniformly around inner end-cap 22, a hydraulic pressure medium is introduced into compartment Y through a port 21 and filtrate is expressed through the filter element and through apertures, such as 11, in the inner tubular body, and then removed by a siphon tube 16. Thereafter, the inner and outer tubular bodies are displaced axially relative to one another so that filter cake which is supported on the filter element can be discharged by blowing compressed air through the filter element from within the inner tubular body.

The effective life of the filter element used with the tube pressure filter described above was 4,000 filtration cycles.

I claim:

1. In a tube pressure filter comprising inner and outer tubular bodies arranged substantially coaxially one within the other and spaced apart so as to define between them a chamber of annular cross-section, filtering means supported by the inner of said tubular bodies, and an impermeable, elastically-extensible wall which divides said chamber into two non-intercommunicating compartments of annular cross-section, one of said compartments being defined generally by the inner of said two tubular bodies and by the impermeable, elastically-extensible wall and the other of said compartments being defined generally by the outer of said two tubular bodies and by the impermeable, elastically-extensible wall, the improvement which comprises forming the filtering means as an assembly comprising (a) a filtrate receiving and drainage means including a wire mesh sleeve which is of a size such that it fits closely over the inner of said two tubular bodies and which in no direction has more than 200 wires to the inch nor a spacing between the wires smaller than about 0.003 inches but which has in at least one direction at least 60 wires to the inch and a spacing between the wires in said one direction not greater than about 0.012 inches, whereby drainage of filtrate along the wall of the inner tubular body is facilitated, (b) a backing cloth of coarse-textured material on said filtrate receiving and drainage means and (c) a filter element comprising a seamless filter cloth sleeve which fits closely over the backing cloth and which has a pore size sufficiently small to prevent the passage therethrough of the solids in a material to be pressure filtered.

2. A tube pressure filter as claimed in claim 1, wherein said coarse-textured backing cloth is constructed so that when it is subjected to tension in a given direction the backing cloth elongates in that direction and contracts in the direction normal to the line of action of the tension.

3. A tube pressure filter as claimed in claim 1, wherein said backing cloth has a thickness not greater than 2 mm.

4. A tube pressure filter as claimed in claim 1, wherein said backing cloth has the properties of a felt.

5. A tube pressure filter as claimed in claim 1, wherein said backing cloth is formed from short-staple fibres of a thermoplastic synthetic polymer.

6. A tube pressure filter as claimed in claim 1, wherein said backing cloth consists of short-staple fibres of a thermoplastic synthetic polymer laid upon a grid of continuous filament fibres.

7. A tube pressure filter as claimed in claim 1, wherein said filter cloth sleeve is woven from a continuous filament yarn.

8. A tube pressure filter as claimed in claim 7, wherein said continuous filament yarn is a man-made polymeric material which is thermoplastic and wherein the filter cloth sleeve is heat set.

9. A tube pressure filter as claimed in claim 8, wherein said filter cloth sleeve has been shrunk on to said backing cloth by blowing hot air at a temperature in the range of from 150°C to 190°C on to the surface of the filter cloth sleeve after it has been pulled over the backing cloth.

* * * * *